US007645986B2

(12) United States Patent
Kikuma et al.

(10) Patent No.: US 7,645,986 B2
(45) Date of Patent: *Jan. 12, 2010

(54) MASS SPECTROMETER

(75) Inventors: Hiromichi Kikuma, Hitachinaka (JP); Hidenori Nanba, Naka (JP); Akimasa Osaka, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/149,053

(22) Filed: Apr. 25, 2008

(65) Prior Publication Data

US 2008/0203292 A1 Aug. 28, 2008

Related U.S. Application Data

(63) Continuation of application No. 11/627,460, filed on Jan. 26, 2007, now Pat. No. 7,375,318.

(30) Foreign Application Priority Data

Mar. 9, 2006 (JP) ............................ 2006-063480

(51) Int. Cl.

*H01J 49/40* (2006.01)
*H01J 49/42* (2006.01)
*B01D 59/44* (2006.01)

(52) U.S. Cl. ...................... 250/282; 250/287; 250/283; 250/294

(58) Field of Classification Search ................ 250/282, 250/287, 283, 294

See application file for complete search history.

(56) References Cited

U.S. PATENT DOCUMENTS

| | | | | |
|---|---|---|---|---|
| 5,869,829 | A | 2/1999 | Dresch | |
| 6,670,606 | B2 * | 12/2003 | Verentchikov et al. | 250/287 |
| 6,700,117 | B2 | 3/2004 | Franzen | |
| 6,707,033 | B2 | 3/2004 | Okumura et al. | |
| 7,375,318 | B2 * | 5/2008 | Kikuma et al. | 250/287 |
| 2002/0117616 | A1 * | 8/2002 | Vestal | 250/287 |

FOREIGN PATENT DOCUMENTS

JP 2005-108578 4/2005

* cited by examiner

*Primary Examiner*—Nikita Wells
(74) *Attorney, Agent, or Firm*—Mattingly & Malur, PC

(57) ABSTRACT

An object of the present invention is to provide a mass spectrometer that uses a time-of-flight mass spectrometer for performing mass spectrometry on the basis of the difference in flight time based on mass of desired ions, and that is suitable for improving the sensitivity and analysis precision of the mass spectrometer. A gate electrode is located at a stage before an acceleration region that is located before an emitter for emitting ions. This gate electrode is capable of applying the voltage that is set on a mass-number region basis, and is also capable of separating desired ions to be measured on the basis of the mass number by switching the gate electrode at high speed. Therefore, it is possible to improve the resolution.

4 Claims, 4 Drawing Sheets

MASS SPECTROMETER

This application is a continuation application of U.S. Ser. No. 11/627,460, filed Jan. 26, 2007 now U. S. Pat. No. 7,375, 318.

BACKGROUND OF THE INVENTION

1. Field of the Invention

The present invention relates to mass spectrometers, and more particularly to a tandem mass spectrometer in which a time-of-flight mass spectrometer is combined with a mass spectrometer such as a quadrupole mass spectrometer and an ion trap mass spectrometer.

2. Description of the Related Art

A mass spectrometer ionizes molecules to be measured, and emits the ionized molecules to an electric field/a magnetic field. Then, the mass spectrometer uses the difference in flight course based on the mass number/ionic valence to determine a mass-to-charge ratio (m/z), and thereby to identify a kind of molecules to be measured. As a method for detecting the difference in flight course, there are a method for determining how a flight course is curved (quadrupole mass spectrometer), a method for measuring a difference in flight time (time-of-flight mass spectrometer), and the like. In order to improve the analysis precision/efficiency, a method in which molecules to be measured are selected on a molecular weight basis using a column in front of a mass spectrometer (liquid chromatography, gas chromatography) is used in combination with the above methods. In order to further select molecules to be measured, a quadrupole mass spectrometer or an ion trap mass spectrometer is also often located in front of the mass spectrometer so that the molecules which have been selected by the chromatography fall within a range of a specific mass-to-charge ratio. To be more specific, by applying a constant high-frequency current between electrodes of the quadrupole mass spectrometer, which are opposed to each other, or between ring and end-cap electrodes of an ion trap, it is possible to accumulate ions in the electrodes. Moreover, by applying an assistant high-frequency current having specific frequency/voltage, only ions which fall within a specific mass-to-charge ratio can be kept remained in the electrodes. A method for improving the precision/efficiency of the mass spectrometry in this manner is disclosed in, for example, Patent Document 1 (JP-A-2005-108578).

SUMMARY OF THE INVENTION

If an ion trap or the like is used, by applying an assistant high-frequency current, it is possible to accumulate only ions that fall within a specific mass-to-charge ratio. However, there is a case where such ions also include ions that fall within a targeted mass-to-charge ratio. These ions are emitted from the ion trap towards a detector all at once together with the ions that fall within the targeted mass-to-charge ratio. The emitted ions then reach the detector. Because of it, a peak of ions which are not included in desired ions overlap a region surrounding a peak of the desired ions. As a result, the resolution of the peak is reduced.

An object of the present invention is to limit the number of ions entering a detector by further providing, in back of an ion trap, a gate electrode for passing only ions that fall within a specific mass-to-charge ratio, and thereby to improve the resolution of a mass spectrometer.

Means for Solving the Problem

In order to achieve the above-described object, according to the present invention, a gate electrode is provided in back of ion trapping means such as an ion trap. This gate electrode is capable of applying the voltage that is set on a mass-number region basis. In addition, the gate electrode can be switched at high speed. This makes it possible to reduce the number of ions that are not necessary for the measurements, and that enter an acceleration region. In addition, it is possible to provide ions with the kinetic energy that is sufficient for mass separation. Moreover, because it is possible to prevent ions which are not necessary for the measurements from entering an acceleration region, an effect of reducing the background is also produced when the measurements are made by use of the mass chromatogram, or the like. Because it is possible to efficiently emit ions from an acceleration region, and also to reduce the background, it is possible to ensure the precision of analysis.

When a gas chromatograph (GC) or a liquid chromatograph (LC) is located in front of a mass spectrometer to make measurements by use of the mass chromatogram, or the like, it is possible to prevent ions, which are not necessary for the measurements, from entering an acceleration region. This produces an effect of reducing background, and accordingly it is possible to ensure the precision of analysis.

DESCRIPTION OF THE PREFERRED EMBODIMENTS

Figure 1:
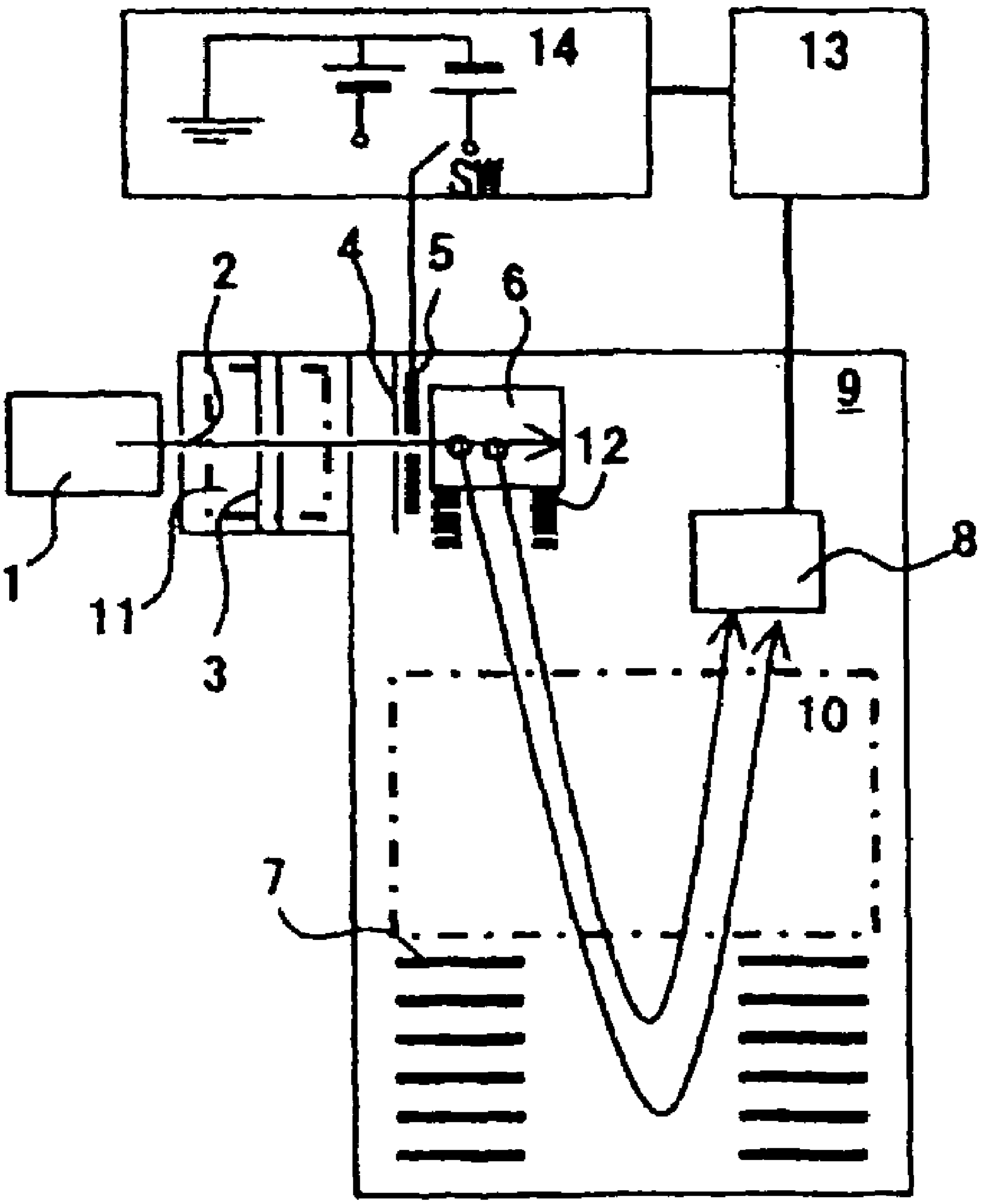
FIG. 1 is a diagram illustrating a basic configuration of an orthogonal time-of-flight mass spectrometer according to the present invention.

FIG. 1 is a diagram schematically illustrating as an example a configuration of an orthogonal time-of-flight mass spectrometer according to one embodiment of the present invention. In an ion source 1 that is located in the air or in a vacuum region, desired ions, which have been successively or intermittently generated, are introduced from a sampling orifice 2 into a vacuum region 11 whose pressure is set at a value that is lower than that of the ion source 1. Only ions are selected by an ion lens 3 located in the vacuum region 11. The desired ions are introduced into the orthogonal time-of-flight mass spectrometer that is located in a high vacuum region 9 whose pressure is set at a lower value. The desired ions which have entered the time-of-flight mass spectrometer pass through a slit 4 having a function of totally controlling the extent to which an ion beam extends in a constant direction. After the desired ions have passed through the slit 4, the number of the desired ions to be introduced into the acceleration region 6 is limited by applying voltage to a gate electrode 5 located between the slit 4 and the acceleration region 6. By limiting the number of the desired ions to be introduced, it is possible to reduce the extension of spatial distribution of the desired ions in the acceleration region 6. Moreover, because the number of ions to be introduced into the acceleration region 6 is limited, it is possible that the desired ions receive without waste the energy that is given from an accelerating electrode 12 when the desired ions are emitted (fly) from the accelerating electrode 12 towards a mirror electrode (reflector) 7. To be more specific, it is possible to achieve the high precision of analysis by removing obstacles to the emittance (flight) of the desired ions. The accelerating electrode 12 accelerates an electric field so that the desired ions fly through the field free region 10. Then, the voltage applied by the mirror electrode 7 causes the desired ions to be inverted in a direction opposite to the traveling direction. Again, the desired ions which have flown through the field free region 10 reach a detector 8.

Figure 2A:
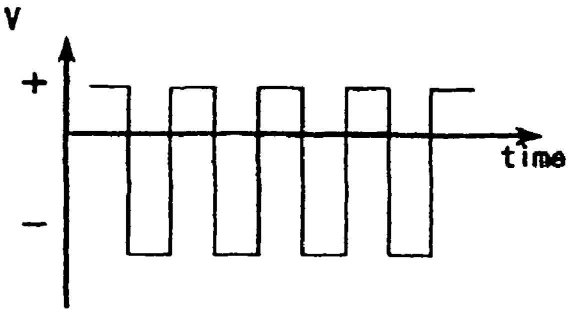
FIG. 2A is a diagram illustrating the voltage that is applied to a gate electrode, when desired ions are positive ions.
Figure 2B:
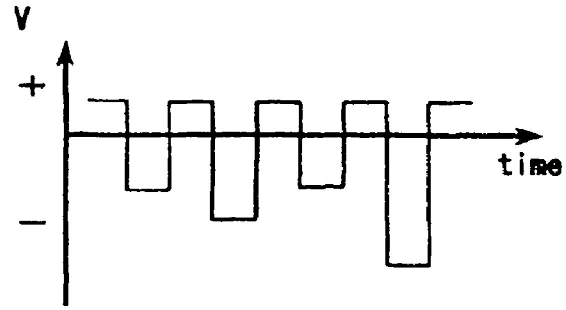
FIG. 2B is a diagram illustrating the voltage applied to the gate electrode when the desired ions are positive ions and the applied voltage is changed.
Figure 2C:
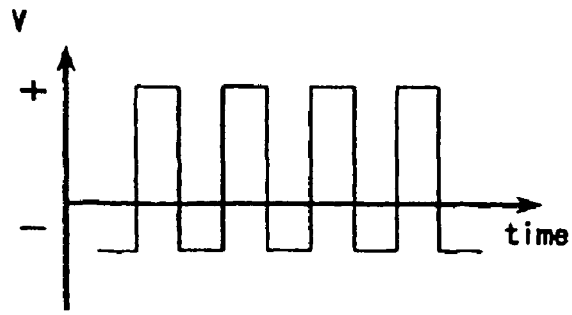
FIG. 2C is a diagram illustrating the voltage applied to the gate electrode when the desired ions are negative ions.

FIGS. 2A, 2B, 2C are diagrams each illustrating a voltage control sequence of a mass spectrometer according to one embodiment of the present invention.

A controller 13 controls the voltage applied from the power source 14 to the gate electrode 5 that is located between the slit 4 and the acceleration region 6. By applying voltage to the gate electrode 5, unnecessary ions is introduced the acceleration region 6 is controlled. As a result, it is possible to reduce a loss of kinetic energy to be given to the desired ions. In addition, if measurements are made in a mass-number region whose mass number is higher than a certain mass number, and by limiting the introduction of ions whose mass number is lower than or equal to the certain mass number into the acceleration region, it is possible to prevent unnecessary ions from being emitted (flown) from the acceleration region 6. Therefore, if mass chromatogram is used to make measurements, the background is reduced. Accordingly, it is possible to make a peak judgment even for trace level ions. If measurements are made in steps in each mass-number region, the voltage may also be changed ion steps. If measurements are made in all mass-number regions, it is desirable not to apply the voltage.

Moreover, the controller 13 is provided with two kinds of power sources each corresponding to positive ions or negative ions. The positive and negative of the desired ions cause a switch SW to switch the voltage to be applied to the gate electrode. So that if the desired ions are positive ions, the voltage to be applied to the gate electrode 5 can be changed to minus, whereas if the desired ions are negative ions, the voltage to be applied to the gate electrode 5 can be changed to plus.

Figure 3:
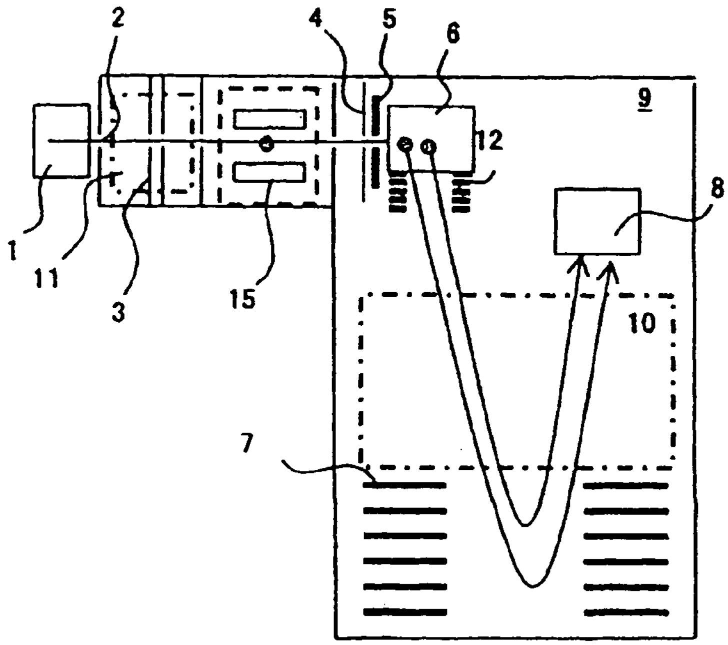
FIG. 3 is a diagram illustrating a configuration of a mass spectrometer in which a quadrupole mass spectrometer is located in front of an orthogonal time-of-flight mass spectrometer.
Figure 4:
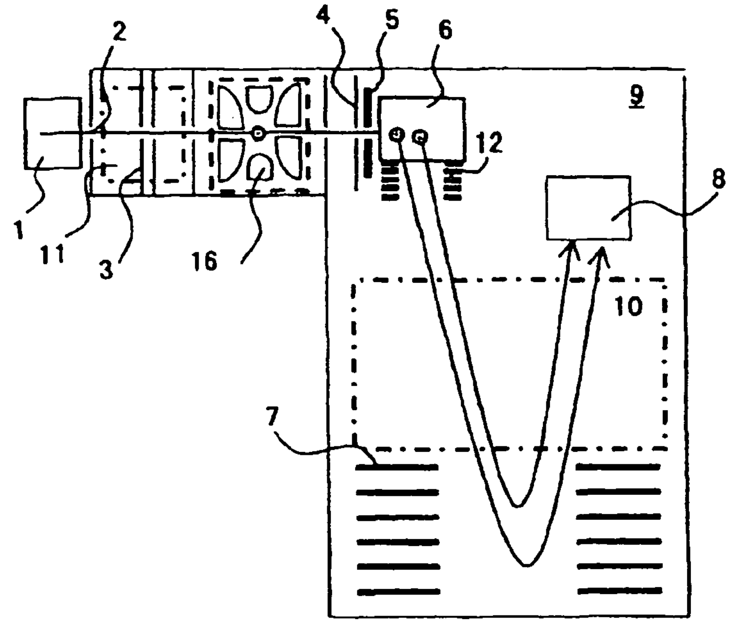
FIG. 4 is a diagram illustrating a configuration of a mass spectrometer in which a 3-dimensional quadrupole mass spectrometer is located in front of an orthogonal time-of-flight mass spectrometer.

FIG. 3 is a diagram illustrating another configuration of a mass spectrometer according to one embodiment of the present invention. In the ion source 1 that is located in the air or in a vacuum region, desired ions are successively or intermittently generated. Then, the desired ions are introduced into the vacuum region 11 from the sampling orifice 2. From the ions that have been introduced into the vacuum region 11, only ions are selected by the ion lens 3 located in the vacuum region 11. The desired ions are dissociated by a quadrupole mass spectrometer 15 that is located as a reactor cell. The dissociated ions are introduced into the time-of-flight mass spectrometer located in the high vacuum region 9, and is then detected by a detector. As shown in FIG. 4, instead of the quadrupole mass spectrometer, a 3-dimensional quadrupole mass spectrometer 16 may also be located as a reactor cell.

Figure 5:
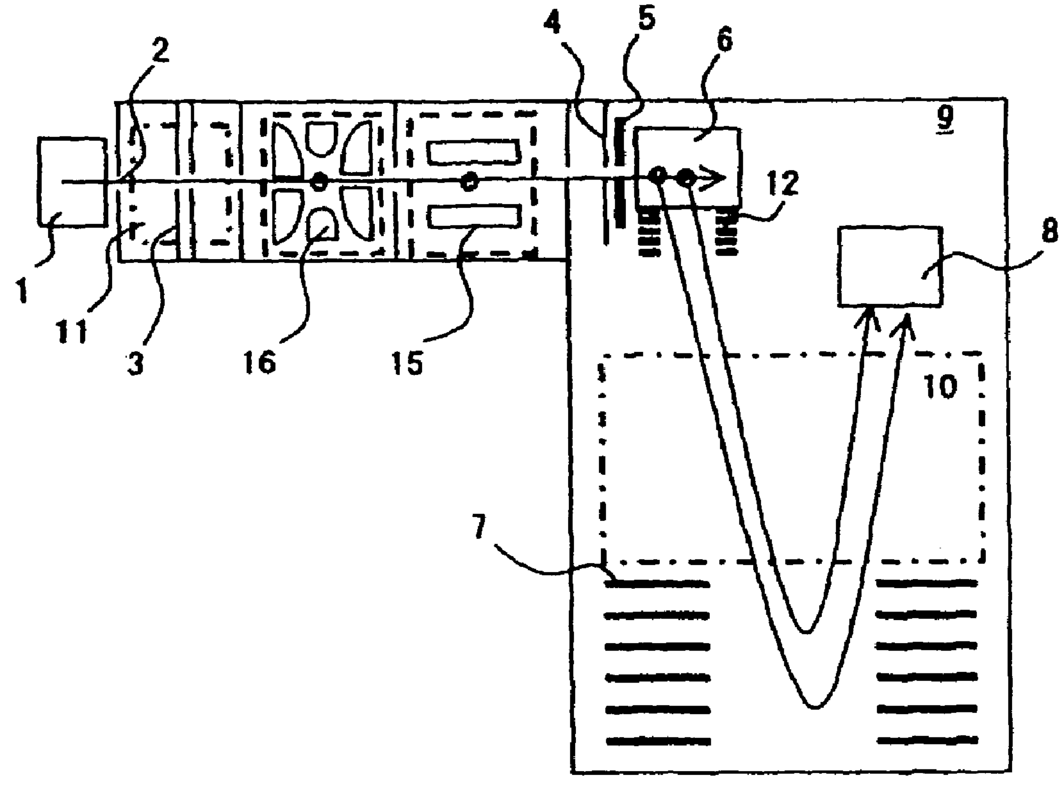
FIG. 5 is a diagram illustrating a configuration of a mass spectrometer in which a 3-dimensional quadrupole mass spectrometer and a quadrupole mass spectrometer are located in front of an orthogonal time-of-flight mass spectrometer.

Moreover as shown in FIG. 5, the quadrupole mass spectrometer 15 and the 3-dimensional quadrupole mass spectrometer 16 may also be located in series as a reactor cell. In this case, even if the quadrupole mass spectrometer is used as a mass filter for selecting ions, this configuration can be used in the same manner.

What is claimed is:

1. A method for improving the resolution of a mass spectrometer comprising steps of:

generating ions from an ion source;

dissociating the ions generated from said ion source by a reactor cell;

emitting said ions into an electric field or a magnetic field by an ion emitting means;

generating a potential difference in a direction of a flow of said ions by a gate electrode being located between the ion emitting means and said reactor cell; and detecting ions emitted into said electric field or said magnetic field.

2. The method for improving the resolution of a mass spectrometer according to claim 1, wherein positive and negative pulses are applied to said ions to generate said potential difference in said direction of said flow of said ions.

3. The method for improving the resolution of a mass spectrometer according to claim 1, wherein voltage is applied to said ions in response to the mass number of desired ions to be emitted into said electric field or said magnetic field.

4. The method for improving the resolution of a mass spectrometer according to claim 1, wherein said ions are trapped in a stage before emitting said ions into said electric field or said magnetic field.

* * * * *